United States Patent
Rastogi et al.

(10) Patent No.: US 10,339,137 B2
(45) Date of Patent: Jul. 2, 2019

(54) SYSTEM AND METHOD FOR CACHING AND PARAMETERIZING IR

(71) Applicant: Futurewei Technologies, Inc., Plano, TX (US)

(72) Inventors: Kumar Rajeev Rastogi, Babusapalya (IN); Yonghua Ding, San Jose, CA (US); Cheng Zhu, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 558 days.

(21) Appl. No.: 14/960,894

(22) Filed: Dec. 7, 2015

(65) Prior Publication Data

US 2017/0161325 A1  Jun. 8, 2017

(51) Int. Cl.
  *G06F 16/00* (2019.01)
  *G06F 16/2453* (2019.01)
  *G06F 16/2452* (2019.01)

(52) U.S. Cl.
  CPC .. *G06F 16/24542* (2019.01); *G06F 16/24524* (2019.01)

(58) Field of Classification Search
  CPC ................................................ G06F 17/30463
  See application file for complete search history.

(56) References Cited

U.S. PATENT DOCUMENTS

| | | | | |
|---|---|---|---|---|
| 6,985,904 B1* | 1/2006 | Kaluskar | ........... | G06F 17/30457 |
| 7,392,245 B1* | 6/2008 | Finlay | ............... | G06F 17/30433 |
| 2003/0200204 A1* | 10/2003 | Limoges | ........... | G06F 17/30404 |
| 2004/0267760 A1 | 12/2004 | Brundage et al. | | |
| 2005/0004892 A1 | 1/2005 | Brundage et al. | | |
| 2006/0122993 A1 | 6/2006 | Dettinger et al. | | |
| 2007/0027905 A1 | 2/2007 | Warren et al. | | |
| 2008/0098003 A1* | 4/2008 | Dias | ................. | G06F 17/30306 |
| 2012/0150913 A1 | 6/2012 | De Smet et al. | | |
| 2013/0198166 A1* | 8/2013 | Prout | ................ | G06F 17/30442 707/718 |
| 2014/0046928 A1* | 2/2014 | Konik | ............... | G06F 17/30463 707/718 |

(Continued)

FOREIGN PATENT DOCUMENTS

| | | |
|---|---|---|
| CN | 1609855 A | 4/2005 |
| CN | 1609856 A | 4/2005 |

(Continued)

OTHER PUBLICATIONS

Diaconu., C. et al., "Hekaton: SQL Server's Memory-Optimized OLTP Engine," SIGMOD, Jun. 22-27, 2013, 12 pgs.

(Continued)

*Primary Examiner* — Augustine K. Obisesan
*Assistant Examiner* — Lahcen Ennaji
(74) *Attorney, Agent, or Firm* — Slater Matsil, LLP

(57) ABSTRACT

A system and method of caching and parameterizing intermediate representation code includes receiving, by a database, a query, parsing, by the database, the query to obtain a plan tree comprising a plurality of plan nodes arranged in hierarchical order descending from a top plan node, generating, by the database, node intermediate representations (IRs) for the plan nodes, executing, by the database, a first query using the node IRs, and reusing, by the database, the node IRs to execute subsequent queries.

19 Claims, 5 Drawing Sheets

(56) References Cited

U.S. PATENT DOCUMENTS

2017/0060948 A1\* 3/2017 Ma .................... G06F 17/30463

FOREIGN PATENT DOCUMENTS

| CN | 1786950 A | 6/2006 |
|---|---|---|
| CN | 102591925 A | 7/2012 |

OTHER PUBLICATIONS

Lattner, C., et al., "LLVM: A compilation framework for lifelong program analysis & transformation," IEEE International Symposium on in Code Generation and Optimization, pp. 75-86, Mar. 2004.

Li, N., "Inside Cloudera Impala: Runtime Code Generation," http://blog.cloudera.com/blog/2013/o2/inside-cloudera-impala.runtime.com, Feb. 11, 2013, 5 pgs.

Neumann, T., "Efficiently Compiling Efficient Query Plans for Modem Hardware," Proceedings of the VLDB Endowment, vol. 4, No. 9, The 37th Int'l Conference on Very Large Data Bases, Aug. 29-Sep. 3, 2011, Seatle, Washington, pp. 539-550.

"Execution Plan Caching and Reuse," SQL Server 2008 R2, http://technet.microsoft.com/en-US/library/ms181055(v=SQL.105).aspx, downloaded Sep. 4, 2015, 5 pgs.

Wanderman-Milne, et al., "Runtime Code Generation in Cloudera Impala," Bulletin of the IEEE Computer Society Technical Committee on Data Engineering, Mar. 2014, pp. 31-37.

Nagel et al., "Recycling in Pipelined Query Evaluation," Proceedings—29th IEEE International Conference on Data Engineering, Apr. 8-12, 2013, pp. 338-349.

\* cited by examiner

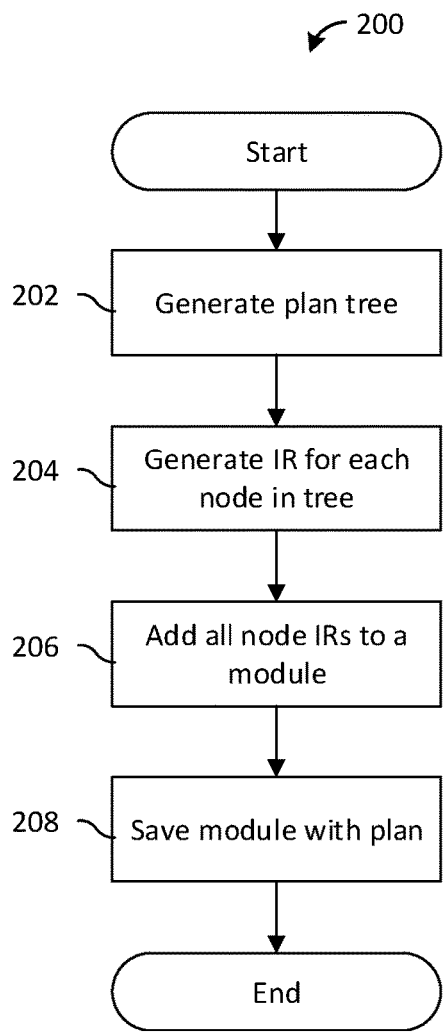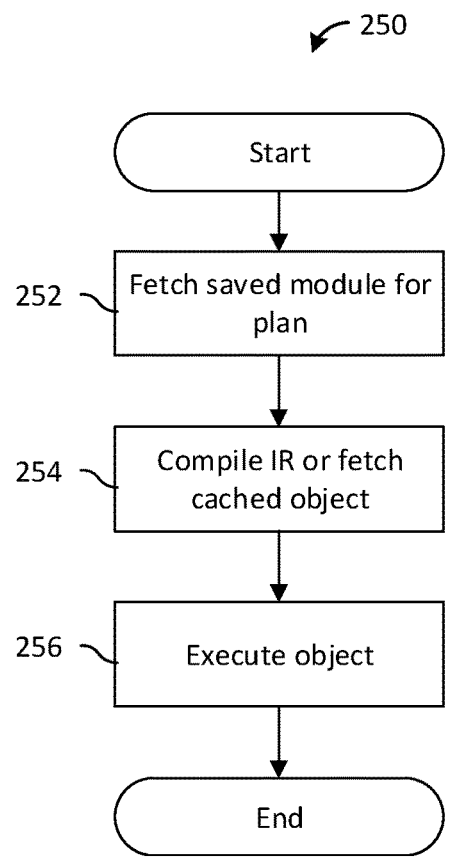
Fig. 2A
Fig. 2B

SYSTEM AND METHOD FOR CACHING AND PARAMETERIZING IR

TECHNICAL FIELD

The present invention relates generally to database systems and methods, and in particular embodiments, to techniques and mechanisms for caching and parameterizing intermediate representation (IR) code.

BACKGROUND

With decreasing prices of memory and high-speed storage devices, central processing unit (CPU) performance has become as much of a bottleneck in database efficiency as input/output (I/O) performance. Traditional database systems must accommodate all variations and forms of data and thus traditional query execution models make many branching and iterative decisions when executing a query. Such an execution model results in each query being parsed and executed at run time by the database engine. Queries that would otherwise share similar code branches must nevertheless be parsed, planned, and executed anew each time.

Native compilation has been proposed to address the problems associated with a single parsing and execution pathway in a database engine. Code that is specific to a query may be generated at run time and executed by the database engine. Generation of computer code tailored to a query avoids parsing and executing queries in an iterative manner that requires many branching decisions.

Some compiler infrastructures, such as the low level virtual machine (LLVM) project, have proposed performing just-in-time (JIT) compilation of code specific to queries. Such infrastructures typically reduce queries to a low level programming language, or intermediate representation (IR), that is then transformed into machine code at runtime by a JIT compiler. JIT compilation can reduce the CPU processing power required when executing a query, as the database engine may execute code specific to the query instead of generalized code that is capable of responding to any query. However, JIT compilation introduces overhead, as significant CPU resources are required to generate and compile query-specific IR.

SUMMARY OF THE INVENTION

Technical advantages are generally achieved by embodiments of this disclosure, which describe systems and methods for caching and parameterizing IR to reduce JIT compilation costs.

In accordance with an embodiment, a method is provided. The method includes receiving, by a database, a query, parsing, by the database, the query to obtain a plan tree comprising a plurality of plan nodes arranged in hierarchical order descending from a top plan node, generating, by the database, node intermediate representations (IRs) for the plan nodes, executing, by the database, a first query using the node IRs, and reusing, by the database, the node IRs to execute subsequent queries.

In accordance with another embodiment, a method is provided. The method includes receiving, by a database, a first query, parsing, by the database, the first query to obtain a first plan tree comprising a first plurality of plan nodes, generating, by the database, first node intermediate representations (IRs) for the first plurality of plan nodes, parameterizing, by the database, the first node IRs to produce parameterized IRs, combining, by the database, the parameterized IRs to produce a module, storing, by the database, the module and the first plan tree in a plan cache, and executing, by the database, the first query with the module.

In accordance with yet another embodiment, a device is provided. The device includes a processor and a computer-readable storage medium storing a program to be executed by the processor. The program includes instructions for receiving a query, parsing the query to obtain a plan tree comprising a plurality of plan nodes arranged in hierarchical order descending from a top plan node, generating node intermediate representations (IRs) for the plan nodes, executing a first query using the node IRs, and reusing the node IRs to execute subsequent queries.

BRIEF DESCRIPTION OF THE DRAWINGS

For a more complete understanding of the present invention, and the advantages thereof, reference is now made to the following descriptions taken in conjunction with the accompanying drawing, in which:

FIG. 2A illustrates an embodiment node intermediate representation (IR) generation method;

FIG. 2B illustrates an embodiment IR reuse method;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
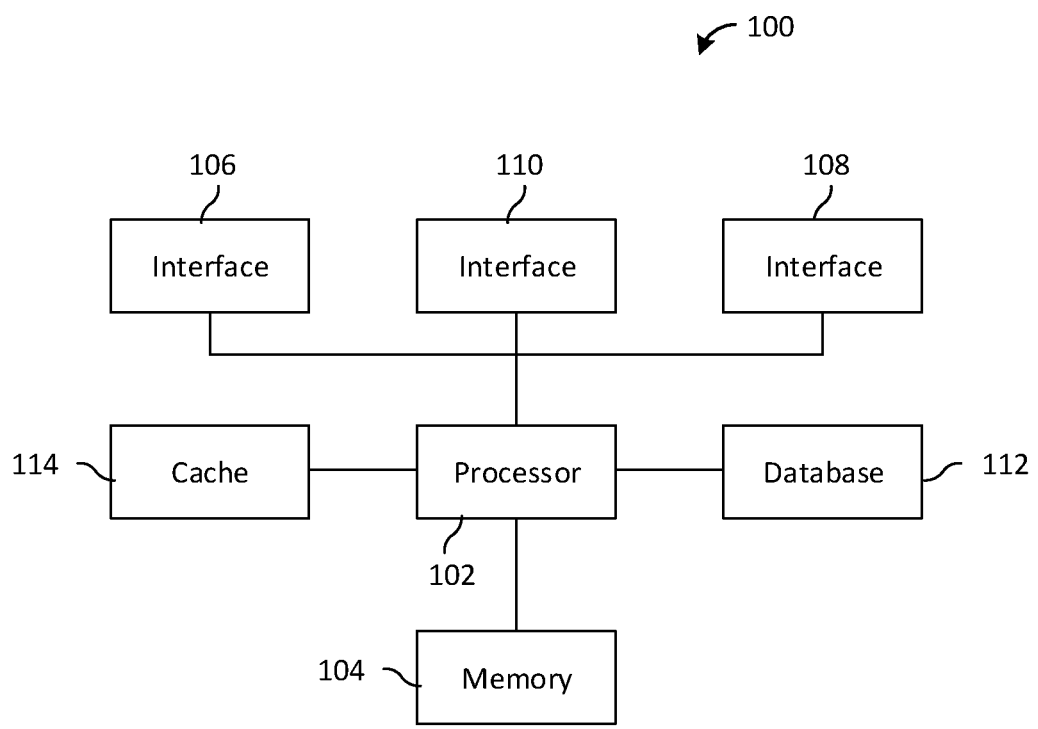
FIG. 1 is a block diagram of an embodiment processing system.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Disclosed herein are systems and methods for caching and parameterizing intermediate representation (IR) code to reduce JIT compilation costs. Although the present discussion is presented in the context of database engines, it should be appreciated that embodiments could be used to generate and execute IR on any type of computer. Modern database engines generate a query execution plan tree and store that plan tree in a plan cache. A plan tree typically includes several plan nodes arranged in hierarchical order. Embodiment techniques produce IR for each node of a plan tree and then save the IR with respective nodes of the plan tree in the plan cache. Cached IR may then be reused on subsequent executions of a query.

During JIT compilation, IR is compiled to machine code for query execution. Compiled machine code may be assembled into a code module, which can include variables, function declarations, function implementations, and the like. Embodiment techniques cache compiled modules such that they can be reused when IR is reused. Thus, in addition to storing IR with nodes of a plan tree, the machine code module generated from the IR may be stored by caching the code module with the top plan node of the plan tree. The cached machine code may thus be reused for subsequent executions of the same query.

Generated IR is typically specific to a plan node. For example, a plan node may include an arithmetic operation involving a constant. Embodiment techniques parameterize the IR or machine code that is generated for plan nodes. Parameterized IR may be more generic IR that is not specific to a particular plan node, such that it may be reused for different plan nodes when those plan nodes differ by only a constant. Parameterized IR may then be reused for different plan nodes in the same or similar queries. Parameterized IR thus transforms particular IR into more generalized IR. By transforming the IR to more generalized IR, the functionality of the database itself is thus improved.

Various embodiments may achieve different advantages. By caching the generated IR or machine code, a full IR generation and JIT compilation may be avoided every time a query is executed. IR generation may account for around 20-30% of the extra CPU time needed for JIT compilation when executing a query. By avoiding IR generation on each execution, IR generation costs may be reduced. Run-time cost for each query executed may thus be reduced. Overall performance of a database may thus be improved. Parameterization of cached IR may further improve reusability of IR, even when there are variations between cached IR and subsequent queries. Improved IR reusability may further increase the cache hit rate for reused IR, further increasing performance.

FIG. 1 is a block diagram of an embodiment processing system 100 for performing methods described herein, which may be installed in a host device. As shown, the processing system 100 includes a processor 102, a memory 104, interfaces 106-110, a database 112, and a cache 114, which may (or may not) be arranged as shown in FIG. 1. The processor 102 may be any component or collection of components adapted to perform computations and/or other processing related tasks, and the memory 104 may be any component or collection of components adapted to store programming and/or instructions for execution by the processor 102. In an embodiment, the memory 104 includes a non-transitory computer readable storage medium. The interfaces 106, 108, 110 may be any component or collection of components that allow the processing system 100 to communicate with other devices/components and/or with a user. For example, one or more of the interfaces 106, 108, 110 may be adapted to communicate data, control, or management messages from the processor 102 to applications installed on the host device and/or a remote device. As another example, one or more of the interfaces 106, 108, 110 may be adapted to allow a user or user device (e.g., personal computer (PC), etc.) to interact/communicate with the processing system 100. The processing system 100 may include additional components not depicted in FIG. 1, such as long term storage (e.g., non-volatile memory, etc.).

The database 112 includes instructions executed by the processor 102, and may be a structured or unstructured database. In some embodiments, the database 112 may be a PostgreSQL database. In some embodiments, the database 112 may be a NoSQL database. The cache 114 in the processing system 100 may be any storage device or space capable of caching information. The cache 114 may cache queries, plans, or results for the database 112. The cache 114 may be located with the memory 104 or be on a separate storage device.

In some embodiments, the processing system 100 is included in a network device that is accessing, or part otherwise of, a telecommunications network. In one example, the processing system 100 is in a network-side device in a wireless or wireline telecommunications network, such as a base station, a relay station, a scheduler, a controller, a gateway, a router, an applications server, or any other device in the telecommunications network. In other embodiments, the processing system 100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

FIG. 2A illustrates an embodiment node IR generation method 200. The IR generation method 200 may be indicative of operations occurring during planning stages in a database.

The IR generation method 200 begins by generating a plan tree for a query (step 202). Next, node IR is generated for each plan node in the query plan tree (step 204). The generated node IR may be specific to each plan node, or may be parameterized (discussed further below). Next, the IR for each plan node is added to a module for the query (step 206). In some embodiments, the module may be produced using an interface to LLVM. Finally, the module is saved in parallel with the query plan tree (step 208). In some embodiments, e.g., embodiments where the database supports plan caching, the query plan and the module are each saved as objects in the plan cache of the database, and the module is associated with the query plan.

FIG. 2B illustrates an embodiment IR reuse method 250. The IR reuse method 250 may be indicative of operations occurring during execution stages of a query performing a database operation when a plan tree and a module for the query were previously saved in the plan cache.

The IR reuse method 250 begins by fetching a saved module corresponding to a query plan tree (step 252). The module may be retrieved when retrieving the plan tree for the query. Next, the IR in the module is either compiled to an executable object, or a cached executable object for the module is fetched (step 254). In some embodiments, the cached executable object is also stored in the plan cache with the query plan tree. In some embodiments, the cached executable object is stored elsewhere. If the module has not yet been compiled, then it is compiled by a JIT compiler. If the module has already been compiled, then the address for the cached executable object is remapped into memory and a function pointer to the executable object is returned to the JIT compiler. Finally, the executable object is executed by the database when performing the query (step 256).

Figure 3:
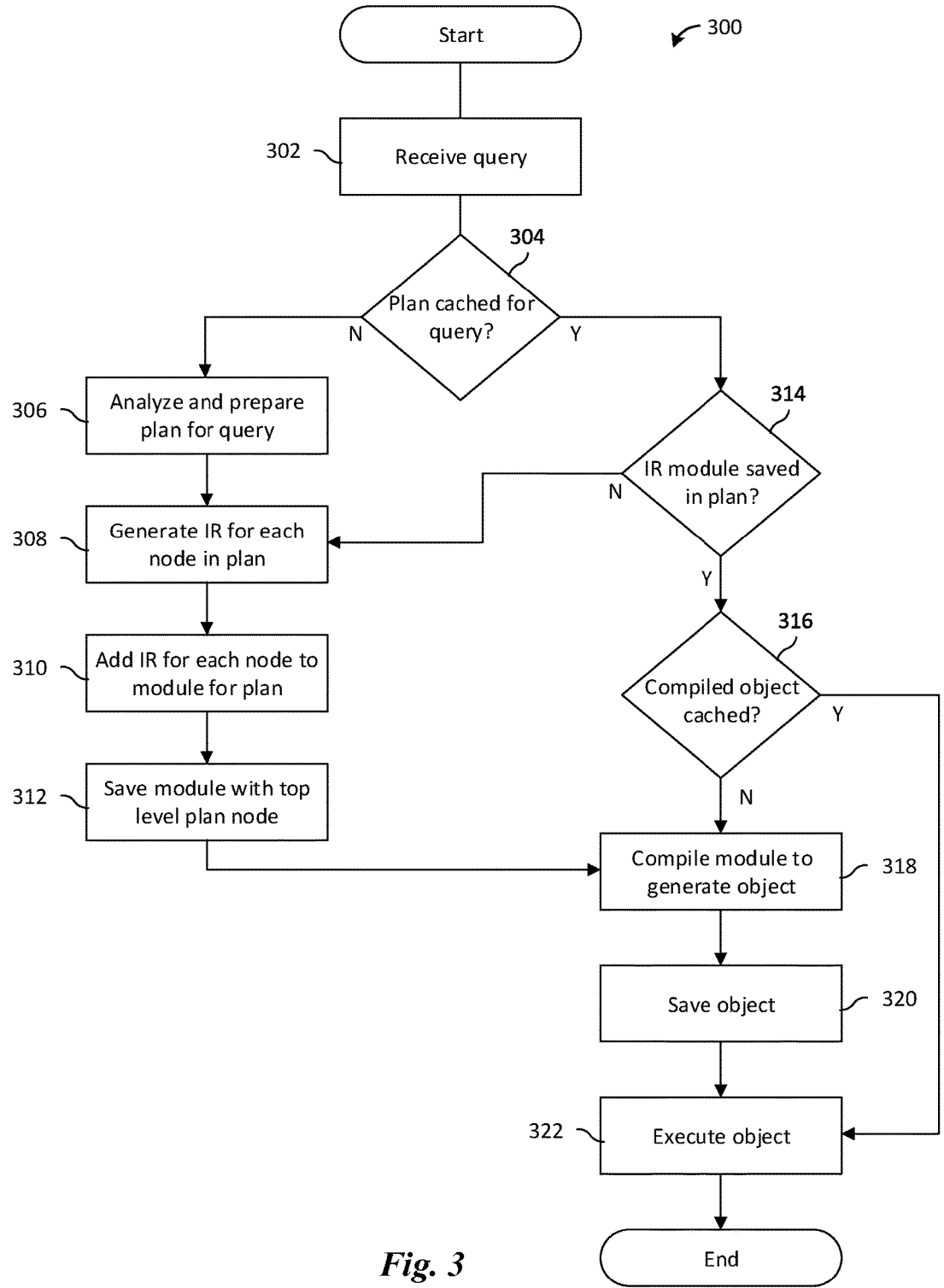
FIG. 3 illustrates an embodiment query method for generating and reusing IR when executing a query.

FIG. 3 illustrates an embodiment query method 300 for generating and reusing IR when executing a query. The query method 300 may be indicative of operations occurring when executing a database query, where the database caches and reuses machine code for the database query.

The query method 300 begins by receiving a query for processing and execution (step 302). Next, the database determines whether a plan tree is cached for the query (step 304). If a plan tree does not exist, then the query is analyzed and a query plan tree is generated (step 306). The plan tree may include a plurality of plan nodes arranged in hierarchical order descending from a top plan node. Next, IR is generated for each plan node in the plan (step 308). The IR may be generated to be interfaced with LLVM. Next, a module is built out of the generated IR by adding the IR for each plan node to the module (step 310). Next, the module is saved with the plan tree by saving the module with the top level plan node of the plan tree (step 312). In some embodiments, the query plan tree and module are saved in the plan cache of the database.

If a plan tree exists for the query, then instead of generating a query plan, the database engine determines whether there is an IR module saved for the plan (step 314). If a module is not saved for the plan, then IR is generated, added to a module, and stored with the plan tree (steps 308-312). However, if a plan is cached and the plan contains an IR module, then the database engine determines whether there is a compiled executable object cached for the module (step 316). If a compiled executable object does not exist, then the module is compiled to obtain an executable object (step 318). Next, the compiled executable object for the module is saved (step 320). In some embodiments, the executable object is saved in the plan cache with the plan tree. This may be achieved, e.g., by expanding the plan cache to include entries for IR, modules, and/or executable objects. Finally, once the executable object is compiled or loaded from a cache, it is executed and the query is performed (step 322).

In addition to caching IR or machine code corresponding to query plans/nodes, embodiments may optimize IR for a node (node IR) before caching it or compiling it to machine code. Embodiment optimizations include parameterizing the node IR during the IR generation, e.g., replacing constants or attributes of table tuples in the body of generated IR code with parameters and modifying the generated IR to accept runtime variables containing the parameters. IR optimization is performed before compilation, and is performed before storing IR or machine code. Embodiment optimizations allow IR to be reused in a query or between queries (e.g., inter-query) even if there would be variations between IR generated for the queries. For example, below is a pseudocode listing of an example query that embodiments may generate and parameterize IR for:

SELECT id+5
FROM tblExample

The example query listed above may be analyzed to produce a plan tree and IR for plan nodes of the plan tree. One of the generated plan nodes for the query will correspond to the addition operation (id+5). The pseudocode listing below illustrates example IR that may be generated for the addition operation:

```
IR_expr( ) {
    %id = evaluate_var(id);
    %r = add i32 %id, 5;
    ret %r;
}
```

The above-listed IR may then be invoked as follows:
call IR_expr ( );

As can be seen in the pseudocode listing above, the body of the produced IR for the addition operation includes opcodes that sum the augend (id) with an addend (5). While the IR shown above may be compiled and reused by a database engine, it is relatively specific and may only be reused for a plan node in another query if that plan node sums the same augend and addend. The augend in this example is an attribute of a table tuple (the "id" column of the "tblExample" database table), while the addend in this example is a constant (5). As a result, future queries that contain even minor variations of the table tuple attribute or constant cannot reuse the listed IR. For example, a query against a column of the table other than the "id" column, or a query summing the column with a value other than 5, would require generation of new IR.

Embodiments may optimize the above IR to parameterize it. Parameterized IR may be a more generalized version of IR called for by a plan node, and extra parameters specific to a node may be passed into the IR on a node-by-node basis. Continuing the above example, the pseudocode listing below illustrates example parameterized IR that may be generated when the constant is replaced with a parameter:

```
IR_expr(i32 %arg) {
    %id = evaluate_var(id);
    %r = add i32 %id, %arg;
    ret %r;
}
```

As can be seen in the pseudocode listing above, the parameterized IR no longer contains constants. Instead, the IR sums the augend (id) with an addend that is an input parameter or variable (% arg). The addend from the original listing (5) is then passed into the IR at runtime. Accordingly, the parameterized IR illustrated may be used for both example queries discussed above. The example query containing an arithmetic operation of (id+5) may invoke the parameterized IR with an argument of 5, e.g.:

call IR_expr (5);

Likewise, the example query containing an arithmetic operation of (id+6) may invoke the parameterized IR with an argument of 6, e.g.:

call IR_expr (6);

In some embodiments, attributes of table tuples in the body of the parameterized IR may also be replaced with a parameter. Continuing the above example, the pseudocode listing below illustrates example parameterized IR that may be generated when the table tuple attribute "id" in the listed IR is replaced with a parameter:

```
IR_expr(i32 %attnum, i32 %arg) {
    %column = get_attr(tblExample, %attnum);
    %id = evaluate_var(%column);
    %r = add i32 %id, %arg;
    ret %r;
}
```

As can be seen in the pseudocode listing above, the parameterized IR no longer contains attributes of table tuples. Instead, the table column the IR accesses (id) is replaced with an input parameter (% attnum). The tuple attribute from the original listing (id) is then passed into the IR at runtime. The example query containing an arithmetic operation of (id+5) may invoke the parameterized IR with an argument of 5, e.g.:

call IR_expr(id, 5);

Because the same IR is used for both example plan nodes above, it can thus be cached and reused inter-query. Accordingly, new IR does not need to be generated for slight variations in plan nodes between queries. Database engine performance may thus be improved by reducing the quantity of IR that must be generated and compiled for each query.

Figure 4:
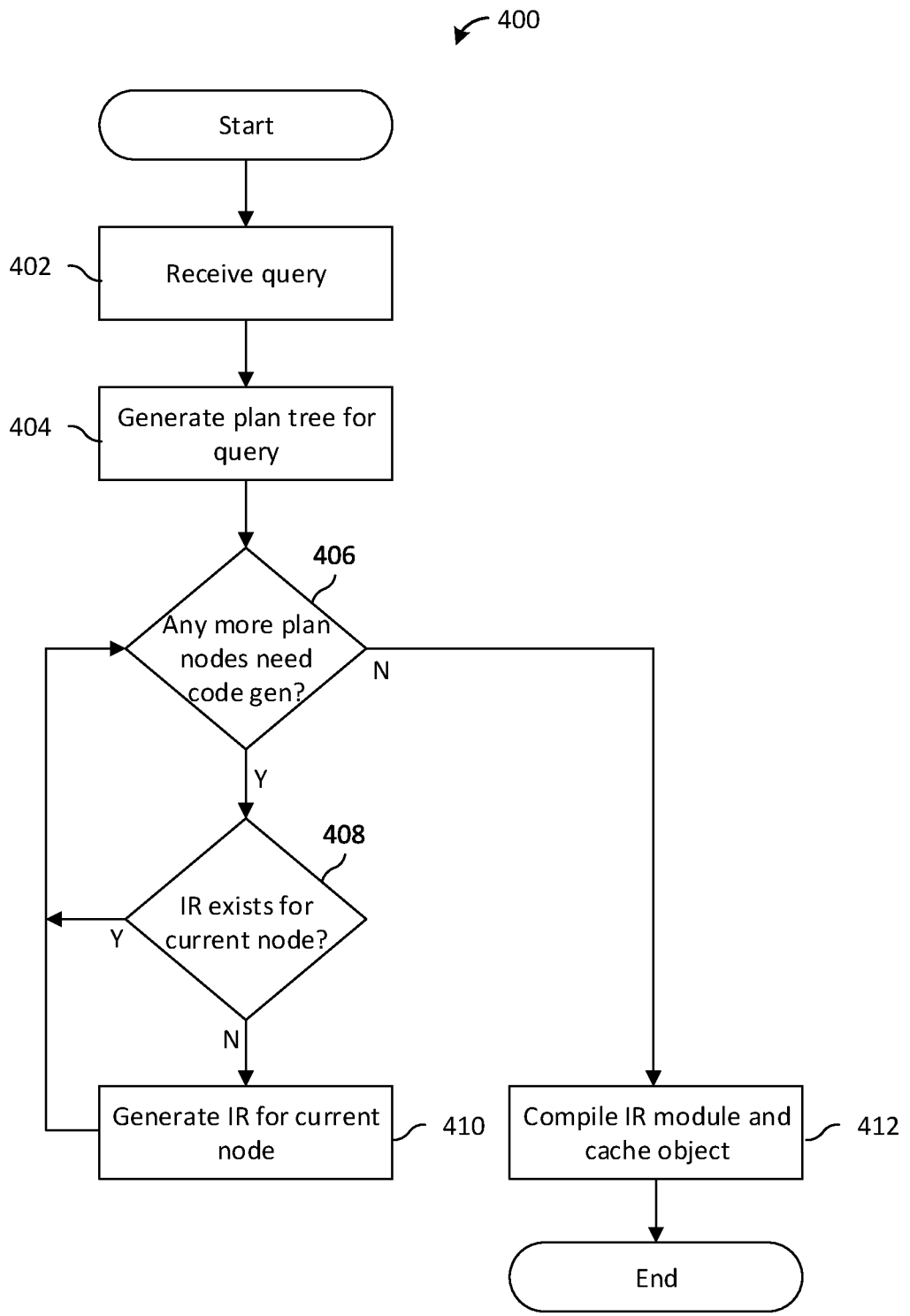
FIG. 4 illustrates an embodiment IR parameterization method.

FIG. 4 illustrates an embodiment IR parameterization method 400. The IR parameterization method 400 may be indicative of operations occurring in a database when generating IR for a query.

The IR parameterization method 400 begins by receiving a query to parse and execute (step 402). Next, the query is parsed and a plan tree is generated for the query (404). Next, the database engine traverses the plan tree and determines whether any more plan nodes need code generation (step 406). This may be determined by CPU profiling and program analysis. If code generation for more nodes is required, then the database engine determines whether IR has been generated for the current node (step 408). If IR does not already exist, then IR is generated for the current plan node (step 410). Generating the IR includes parameterizing the IR to replace constants or table tuple operations in the bodies of the generated expressions with parameters that are passed into the generated IR as runtime variables.

If IR already exists, then the database engine proceeds to the next plan node and does not generate IR for the current plan node. Steps 406-410 may thus be repeated for each plan node in the query plan tree. Finally, once the IR for each plan node in the query has been generated or matched, the IR is assembled into a module, compiled, and cached (step 412).

Figure 5:
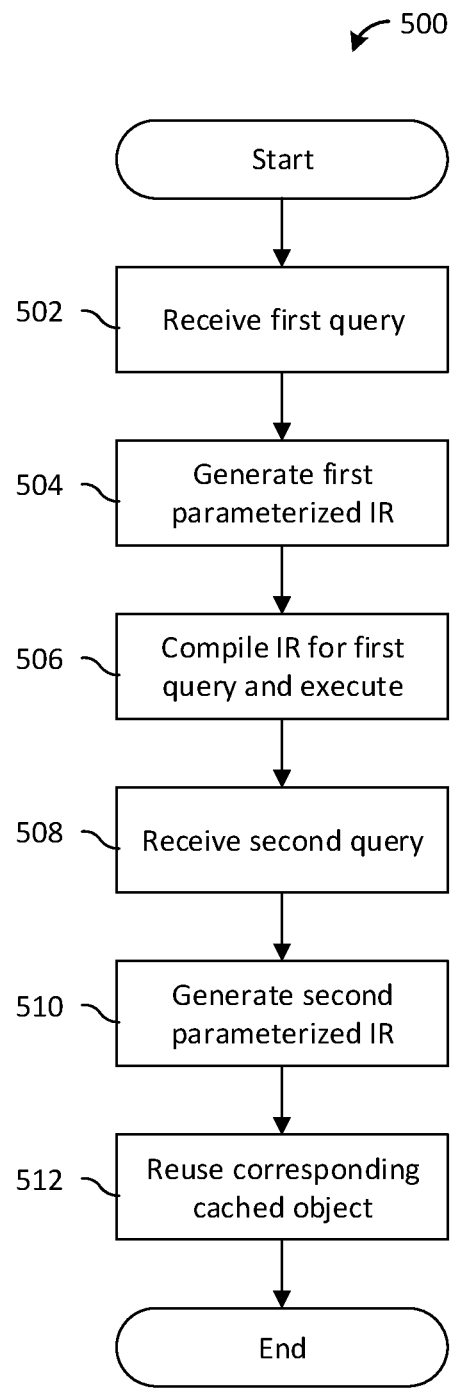
FIG. 5 illustrates an example showing inter-query reuse of parameterized IR.

FIG. 5 illustrates an example 500 showing inter-query reuse of parameterized IR. The example 500 may be illustrative of operations occurring in a database when performing the IR parameterization method 400.

The example 500 begins by receiving a first query (step 502). Next, the database generates first parameterized IR for the first query (step 504). The parameterized IR is compiled, the first query is executed with it, and the compiled object is cached (step 506). The database engine receives a second query (step 508). The database engine generates second parameterized IR for the second query (step 510). Finally, the database engine locates matching IR from the first query for the second query, and reuses the corresponding cached object when executing the second query (step 512). Matching IR may be identical if the difference between the IR for the first query and the IR for the second query has been parameterized in the IR.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method comprising:
receiving, by a database, a first query;
parsing, by the database, the first query to obtain a plan tree comprising a plurality of plan nodes arranged in hierarchical order descending from a top plan node;
generating, by the database, first node intermediate representations (IRs) for the plan nodes;
parameterizing, by the database, the first node IRs to replace one or more constants or tuple attributes in bodies of the first node IRs each with a respective parameter;
combining, by the database, the parameterized first node IRs to obtain a first module for the first query;
executing, by the database, the first query using the first module;
receiving, by the database, a second query;
generating, by the database, second node IRs for the second query;
parameterizing, by the database, the second node IRs to replace one or more constants or tuple attributes in bodies of the second node IRs each with a respective parameter;
matching, by the database, one or more of the parameterized first node IRs each with a corresponding one of the parameterized second node IRs, the matching parameterized first node IRs differing from the corresponding parameterized second node IRs in the respective parameters for each;
reusing, by the database, the parameterized first node IRs to obtain a second module for the second query, the second module being compiled from the matching parameterized first node IRs and unmatched parameterized second node IRs; and
executing, by the database, the second query using the second module.

2. The method of claim 1, further comprising:
storing the first module with the top plan node of the plan tree in a plan cache; and
producing an executable object for the first module.

3. The method of claim 2, wherein producing the executable object for the first module comprises compiling the first module to obtain the executable object and storing the executable object in the plan cache.

4. The method of claim 2, further comprising:
retrieving the first module from the plan cache;
determining whether the plan cache contains the executable object for the first module;
retrieving the executable object, in response to the plan cache containing the executable object;
remapping a memory address of the executable object and producing a function pointer to the memory address; and
executing the executable object with the function pointer.

5. The method of claim 2, further comprising retrieving the parameterized first node IRs from the plan cache.

6. A method comprising:
receiving, by a database, a first query;
parsing, by the database, the first query to obtain a first plan tree comprising a first plurality of plan nodes;
generating, by the database, first node intermediate representations (IRs) for the first plurality of plan nodes;
parameterizing, by the database, the first node IRs to produce first parameterized IRs, the parameterizing comprising replacing one or more constants or tuple attributes in bodies of the first node IRs with corresponding parameters;
combining, by the database, the first parameterized IRs to produce a first module;
storing, by the database, the first module, the first parameterized IRs, and the first plan tree in a plan cache;
executing, by the database, the first query with the first module;
receiving, by the database, a second query;
parsing the second query to obtain a second plan tree comprising a second plurality of plan nodes, the second plurality of plan nodes being different from the first plurality of plan nodes;
generating, by the database, second node IRs for the second plurality of plan nodes;

parameterizing, by the database, the second node IRs to produce second parameterized IRs;

locating, by the database, matching ones of the first parameterized IRs for the second parameterized IRs, the matching ones of the first parameterized IRs differing from corresponding ones of the second parameterized IRs by the corresponding parameters;

combining, by the database, the matching ones of the first parameterized IRs and unmatched ones of the second parameterized IRs to produce a second module; and executing, by the database, the second query using the second module.

7. The method of claim 6, wherein parameterizing the first node IRs to produce parameterized IRs comprises:
   determining whether any bodies of the first node IRs contain expressions with a constant; and
   replacing the constant with an input parameter.

8. The method of claim 7, wherein the constant comprises a literal value.

9. The method of claim 7, wherein the constant comprises a bind value.

10. The method of claim 6, wherein parameterizing the first node IRs to produce parameterized IRs comprises:
    determining whether any bodies of the first node IRs contain expressions with a tuple attribute; and
    replacing the tuple attribute with an attribute position parameter.

11. The method of claim 10, wherein the tuple attribute comprises a column of a table.

12. The method of claim 6, wherein storing the first module and the first plan tree in the plan cache comprises:
    compiling the first parameterized IRs in the first module to produce an executable object; and
    storing the executable object in the plan cache with a top plan node of the first plurality of plan nodes.

13. The method of claim 12, wherein a quantity of modules in the plan cache is less than a quantity of plan trees in the plan cache.

14. A device comprising:
    a processor; and
    a computer-readable storage medium storing a program to be executed by the processor, the program including instructions for:
    receiving a first query;
    parsing the first query to obtain a plan tree comprising a plurality of plan nodes arranged in hierarchical order descending from a top plan node;
    generating first node intermediate representations (IRs) for the plan nodes;
    parameterizing the first node IRs to replace one or more constants or tuple attributes in bodies of the first node IRs each with a respective parameter;
    combining the parameterized first node IRs to obtain a first module for the first query;
    executing the first query using the first module;
    receiving a second query;
    generating second node IRs for the second query;
    parameterizing the second node IRs to replace one or more constants or tuple attributes in bodies of the second node IRs each with a respective parameter;
    matching one or more of the parameterized first node IRs each with a corresponding one of the parameterized second node IRs, the matching parameterized first node IRs differing from the corresponding parameterized second node IRs in the respective parameters for each;
    reusing the parameterized first node IRs to obtain a second module for the second query, the second module being compiled from the matching parameterized first node IRs and unmatched parameterized second node IRs; and
    executing the second query using the second module.

15. The device of claim 14, where the program further includes instructions for:
    storing the first module and the top plan node of the plan tree alongside one another in a plan cache;
    compiling the first module to obtain an executable object; and
    storing the executable object in the plan cache.

16. A device comprising:
    a processor; and
    a computer-readable storage medium storing a program to be executed by the processor, the program including instructions for:
    receiving a first query;
    parsing the first query to obtain a first plan tree comprising a first plurality of plan nodes;
    generating first node intermediate representations (IRs) for the first plurality of plan nodes;
    parameterizing the first node IRs to produce first parameterized IRs, the parameterizing comprising replacing one or more constants or tuple attributes in bodies of the first node IRs with corresponding parameters;
    combining the first parameterized IRs to produce a first module;
    storing the first module, the first parameterized IRs, and the first plan tree in a plan cache;
    executing the first query with the first module;
    receiving a second query;
    parsing the second query to obtain a second plan tree comprising a second plurality of plan nodes, the second plurality of plan nodes being different from the first plurality of plan nodes;
    generating second node IRs for the second plurality of plan nodes;
    parameterizing the second node IRs to produce second parameterized IRs;
    locating matching ones of the first parameterized IRs for the second parameterized IRs, the matching ones of the first parameterized IRs differing from corresponding ones of the second parameterized IRs by the corresponding parameters;
    combining the matching ones of the first parameterized IRs and unmatched ones of the second parameterized IRs to produce a second module; and
    executing the second query with the second module.

17. The device of claim 16, wherein the instruction for parameterizing the first node IRs to produce the first parameterized IRs comprises:
    determining whether any bodies of the first node IRs contain expressions with constants; and
    replacing the constants with corresponding input parameters.

18. The device of claim 16, wherein the instruction for parameterizing the first node IRs to produce the first parameterized IRs comprises:
    determining whether any bodies of the first node IRs contain expressions with a tuple attribute; and
    replacing the tuple attribute with an attribute position parameter.

19. The device of claim 16, wherein the instruction for storing the first module and the first plan tree in the plan cache comprises:
 compiling the first parameterized IRs in the first module to produce an executable object; and
 storing the executable object in the plan cache with a top plan node of the first plurality of plan nodes.

\* \* \* \* \*